United States Patent
Schediwy et al.

(10) Patent No.: US 7,433,167 B2
(45) Date of Patent: Oct. 7, 2008

(54) STRIKE RING BASED ELECTROSTATIC DISCHARGE PROTECTION

(75) Inventors: Richard R. Schediwy, Union City, CA (US); Bob Lee MacKey, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 630 days.

(21) Appl. No.: 11/075,163

(22) Filed: Mar. 8, 2005

(65) Prior Publication Data

US 2006/0203403 A1    Sep. 14, 2006

(51) Int. Cl.
*H02H 7/20* (2006.01)
*H02H 1/00* (2006.01)
(52) U.S. Cl. .................................... 361/112
(58) Field of Classification Search ........... 324/688; 361/112
See application file for complete search history.

(56) References Cited

U.S. PATENT DOCUMENTS

| | | | |
|---|---|---|---|
| 6,370,965 B1 | 4/2002 | Knapp | |
| 6,483,931 B2 * | 11/2002 | Kalnitsky et al. | 382/124 |
| 6,493,198 B1 * | 12/2002 | Arledge et al. | 361/56 |
| 6,835,984 B2 * | 12/2004 | Derkits et al. | 257/355 |
| 6,987,871 B2 * | 1/2006 | Kalnitsky et al. | 382/124 |
| 7,009,410 B2 * | 3/2006 | Ito et al. | 324/690 |
| 2002/0097059 A1 | 7/2002 | Tartagni et al. | |
| 2004/0017640 A1 * | 1/2004 | Hughbanks et al. | 360/323 |

FOREIGN PATENT DOCUMENTS

| | | |
|---|---|---|
| EP | 0 019 291 | 5/1999 |
| EP | 1 347 407 | 9/2003 |
| WO | WO-2004/112448 | 12/2004 |

* cited by examiner

*Primary Examiner*—Ronald W Leja

(57) ABSTRACT

One embodiment in accordance with the invention includes a capacitive sensor apparatus that includes a sensing element and a ground element. The capacitive sensor apparatus also includes a floating strike ring that is electrically isolated from the sensing element. The floating strike ring and the ground element form a spark gap. The spark gap is for reducing potential damage to the capacitive sensor apparatus that can be caused by an electrostatic discharge encountered by the capacitive sensor apparatus.

48 Claims, 11 Drawing Sheets

STRIKE RING BASED ELECTROSTATIC DISCHARGE PROTECTION

BACKGROUND

An electrostatic discharge, which can be referred to as an ESD, is a sudden flow of electric current from one electrically charged conductor to another conductor, sometimes through an insulator. Specifically, a large potential difference across the insulator generates a strong electric field, converting the material's atoms into ions that conduct a current. Electrostatic discharge is a serious problem in electronics, because integrated circuits are made from materials such as silicon, which can break down if exposed to high voltages or high currents. As such, an electrostatic discharge can physically damage or destroy integrated circuits along with associated electronics thereby rendering them essentially useless.

One type of electronic technology that can be susceptible to electrostatic discharge is capacitive touchpad technology, which is part of a broad category of capacitive touch-sensing technology enabling communication of user input to a computing device or other electronic device. A capacitive touchpad includes a sensing region that a user typically touches with a finger, a stylus, or some type of probe. The sensing region is commonly made operative by connecting its sensing electrodes to electronic circuitry, which are all susceptible to damage by electrostatic discharge events.

One traditional way to provide electrostatic discharge protection to a capacitive touchpad involves incorporating a continuous grounded conductive ring into the touchpad that encircles its sensor electrode region. Although this approach has been effective in protecting the sensor region from electrostatic discharge strikes, by virtue of the fact that the conductive ring is grounded, it can be problematic. For example, when a conductor such as moisture is present on the surface of the touchpad facesheet, the conductive ring introduces undesirable capacitive coupling to ground by sensor electrodes located near the conductive ring. As such, the moisture-induced coupling to ground causes the touchpad to operate inconsistently since sensor electrodes located near the conductive ring respond differently than electrodes located further away from the conductive ring, such as, in the center of the sensing region.

In order to reduce this moisture induced coupling to ground, the conductive ring is electrically (ohmically) disconnected from the system's ground and is left floating. Accordingly, any coupling is to the floating conductive ring rather than to a grounded conductive ring. This form of coupling reduces moisture related artifacts. However, it also reduces or eliminates the effectiveness of the conductive ring in protecting the sensor electrodes and their associated sensing circuitry from electrostatic discharge events.

Another traditional way to provide electrostatic discharge protection to an electronic system such as a touchpad involves incorporating diode shunts. Specifically, diodes may be used to protect low voltage signal lines. As such, two diodes are typically connected between the signal line and ground, one in each direction. If the voltage exceeds the switching voltage of the diode, the current is conducted through one of the two diodes. Unfortunately, diodes are often unable to shunt a sufficient amount of current and circuit damage may result.

The present invention may address one or more of the above issues.

SUMMARY

One embodiment in accordance with the invention includes a capacitive sensor apparatus that includes a sensing element and a ground element. The capacitive sensor apparatus also includes a floating strike ring that is electrically isolated from the sensing element. The floating strike ring and the ground element form a spark gap. The spark gap is for reducing potential damage to the capacitive sensor apparatus that can be caused by an electrostatic discharge encountered by the capacitive sensor apparatus.

The drawings referred to in the detailed description should not be understood as being drawn to scale unless specifically noted.

DETAILED DESCRIPTION

Reference will now be made in detail to embodiments of the invention, examples of which are illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the scope of the invention as construed by the claims. Furthermore, in the following detailed description of embodiments in accordance with the invention, numerous specific details are set forth to provide a thorough understanding of the invention. However, it will be evident to one of ordinary skill in the art that the invention may be practiced without these specific details. In other instances, well known methods, procedures, components, and circuits have not been described in detail as not to unnecessarily obscure aspects of the invention.

Figure 1:
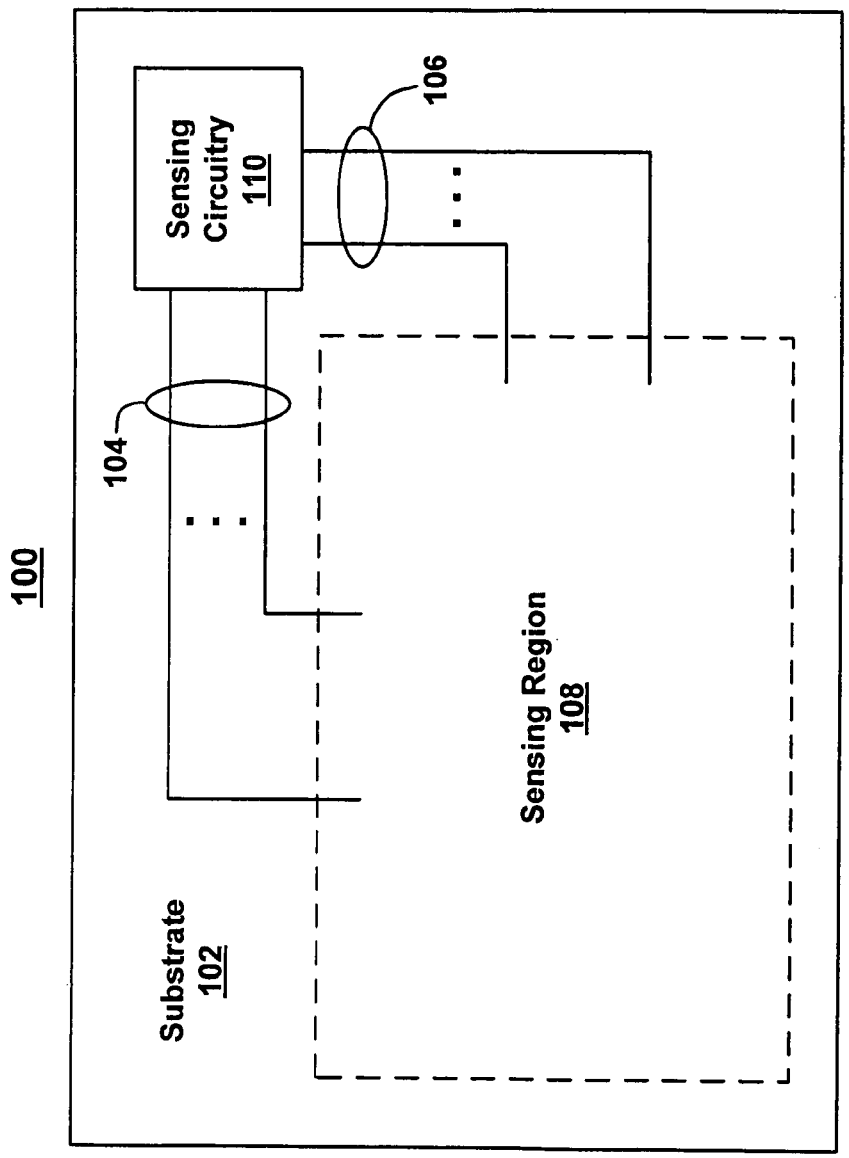
FIG. 1 is a plan view of an exemplary capacitive sensor apparatus that can be implemented to include one or more embodiments in accordance with the invention.

FIG. 1 is a plan view of an exemplary capacitive sensor apparatus 100 that can be implemented to include one or more embodiments in accordance with the invention. The capacitive sensor apparatus 100 can be utilized to communicate user input (e.g., using a user's finger or a probe) to a computing device or other electronic device. For example, capacitive sensor device 100 can be implemented as a capacitive touchpad device that can be formed on a computing device or other electronic device to enable a user interfacing with the device. Note that one or more embodiments in accordance with the present invention can be incorporated with a capacitive touchpad device similar to capacitive sensor apparatus 100.

The capacitive sensor apparatus 100 when implemented as a touchpad can include a substrate 102 having a first set of conductive coupling traces 104 and a second set of conductive coupling traces 106 patterned (or formed) thereon. Substrate 102 of capacitive sensor apparatus 100 can be implemented with, but is not limited to, one or more insulating materials that are utilized as a substrate for a capacitive touchpad device. Conductive coupling traces 104 and/or 106 can be utilized for coupling any sensing elements (not shown) that would form a sensing region 108 with sensing circuitry 110, thereby enabling the operation of capacitive sensor apparatus 100. Conductive coupling traces 104 and 106 may each include one or more conductive coupling elements or traces. It is noted that embodiments of sensing element patterns in accordance with the invention are described herein which can be implemented to form sensing region 108.

Within FIG. 1, the capacitive sensor apparatus 100 can also be implemented as a capacitive touch screen device. For example, substrate 102 of capacitive sensor apparatus 100 can be implemented with, but is not limited to, one or more substantially transparent materials that are utilized as a substrate for a capacitive touch screen device.

Figure 2:
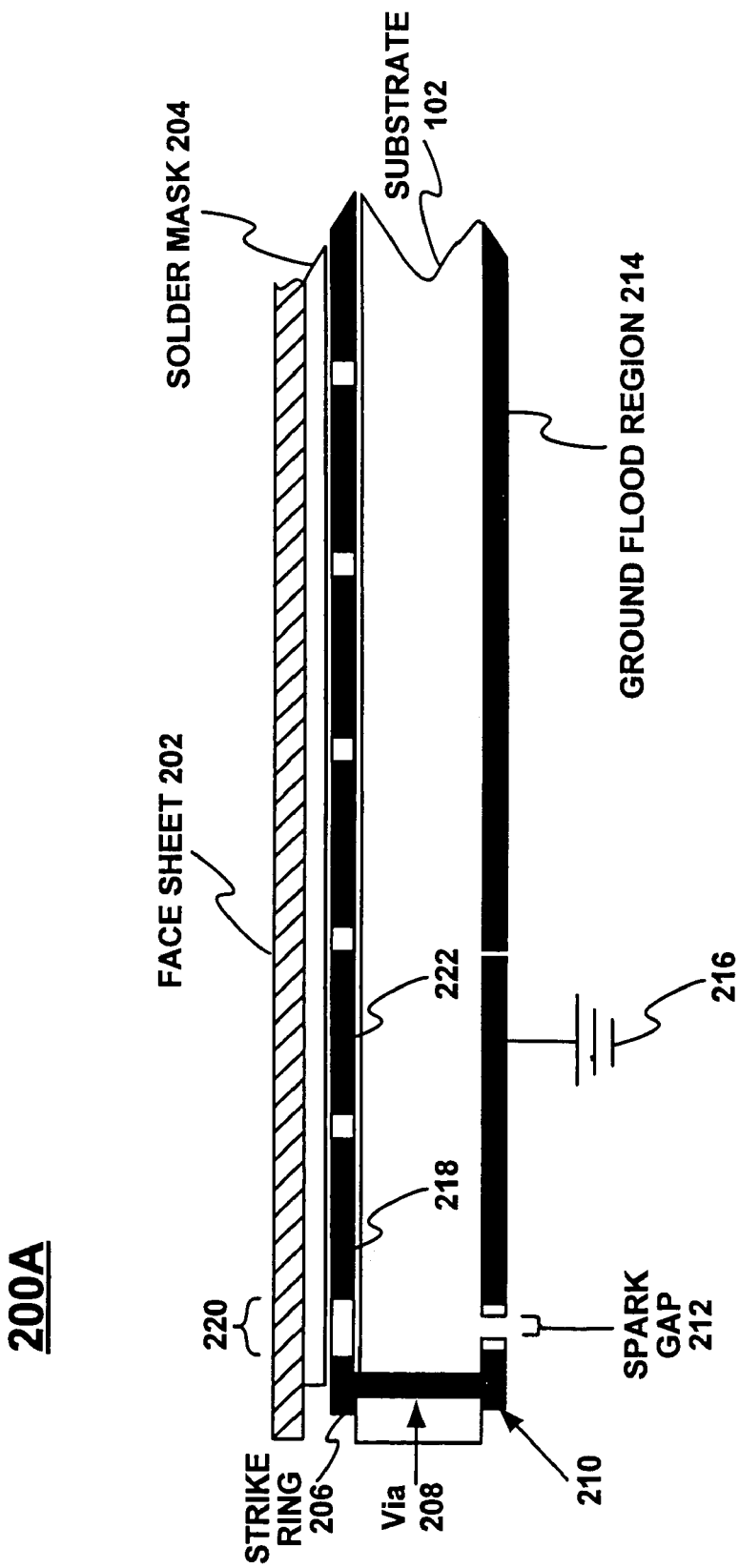
FIG. 2 is an exemplary side sectional view of a portion of an exemplary touchpad in accordance with embodiments of the invention.
Figure 3:
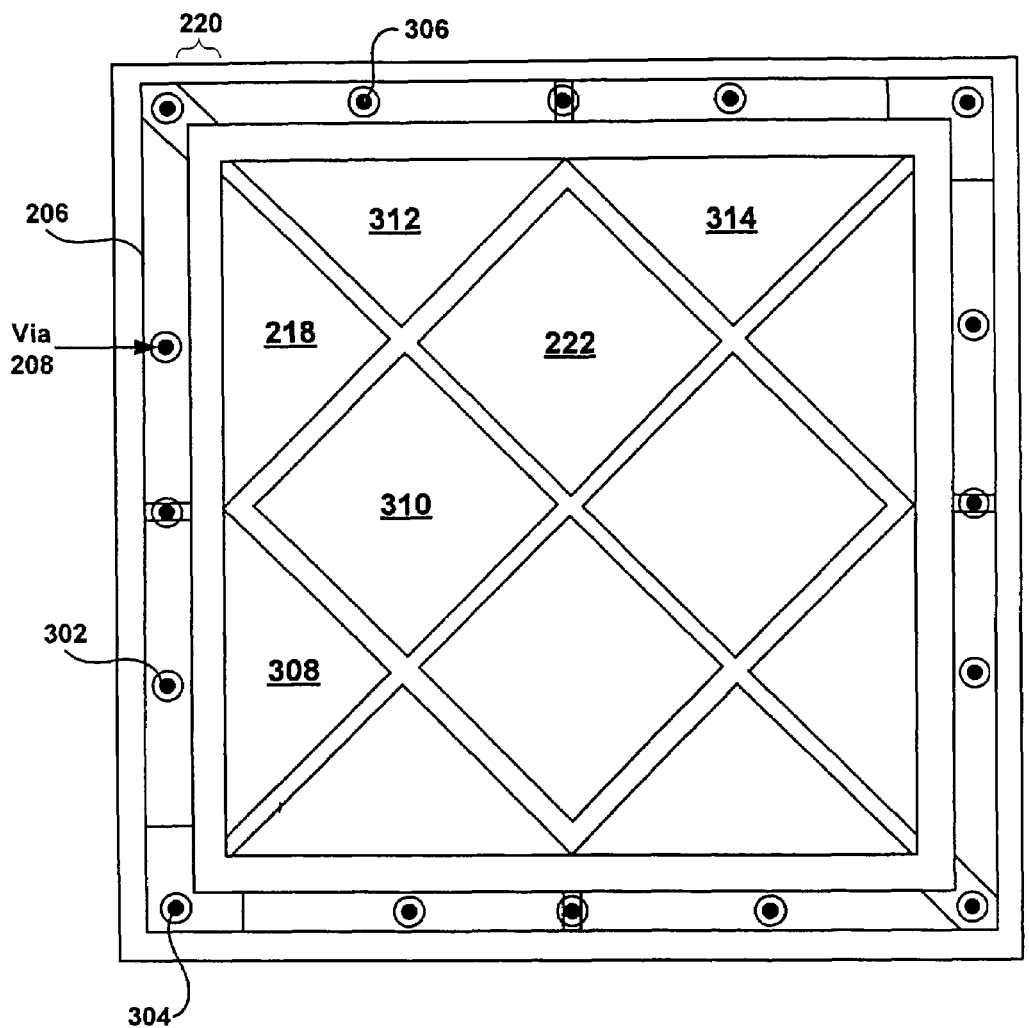
FIG. 3 is an exemplary topside plan view of an exemplary touchpad in accordance with embodiments of the invention.
Figure 4:
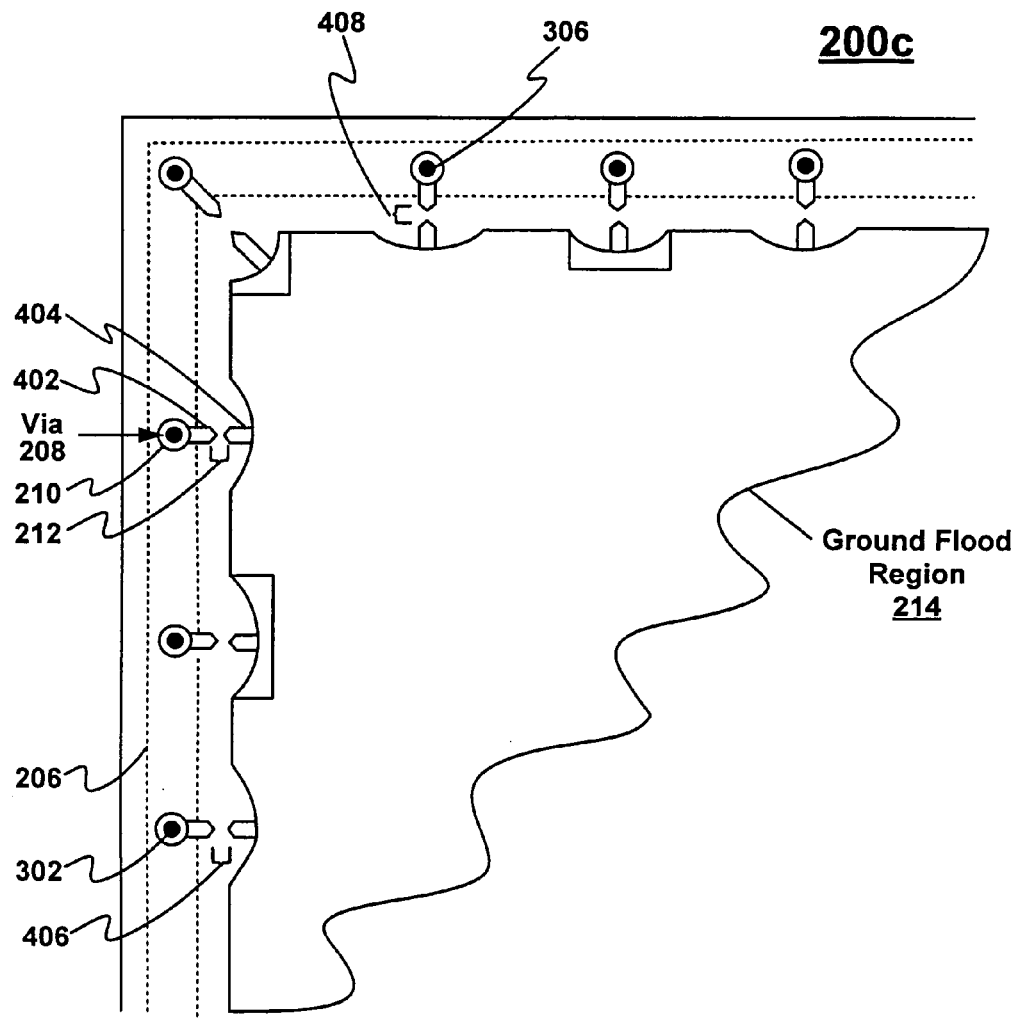
FIG. 4 is an exemplary backside plan view of a portion of an exemplary touchpad in accordance with embodiments of the invention.

FIG. 2 is an exemplary side sectional view 200a of a portion of an exemplary capacitive touchpad 200 that includes a floating strike ring 206 and a spark gap 212 in accordance with embodiments of the invention. When electrically coupled to sensing circuitry (e.g., 110), a sensing region (not shown) provides positioning information which can be derived from which sensing element or elements (e.g., 218 and/or 222) detects an object such as a user's finger, a probe, and the like, proximate to facesheet 202. It is noted that FIG. 3 is an exemplary topside plan view 200b of capacitive touchpad 200 in accordance with embodiments of the invention while FIG. 4 is an exemplary backside plan view 200c of a portion of capacitive touchpad 200 in accordance with embodiments of the invention. The floating strike ring 206 can be implemented with conductive material.

Within touchpad 200 of FIG. 2, the floating strike ring 206 can be electrically isolated from sensing elements (e.g., 218, 222, and the like) along with a ground flood region (or element) 214. However, the floating strike ring 206 and the ground flood region 214 together forms the spark gap 212 that is utilized for reducing potential damage to the capacitive touchpad 200 when it encounters an electrostatic discharge event. In this manner, the spark gap 212 provides the ESD a current path to ground flood region 214 instead of allowing it to flash over into sensing elements or electrodes (e.g., 218 and 222). Additionally, since the strike ring 206 is electrically floating and not directly connected to a voltage ground 216, the voltage of the strike ring 206 can "float" up and down in electrical potential with sensor electrodes (e.g., 218) located near it via capacitive coupling. This form of capacitive coupling between the floating strike ring 206 and the electrodes (e.g., 218) can reduce moisture related artifacts (previously described) that can occur when moisture is present on the surface of a facesheet 202 of touchpad 200. However, if the voltage of the floating strike ring 206 exceeds a breakdown voltage across the spark gap 212 such as during an ESD event, the electric charge arcs over the spark gap 212 and can be dissipated into ground 216 via ground region 214.

It is understood that capacitive touchpad 200 can be implemented in a wide variety of ways. For example, touchpad 200 can be implemented with a greater or lesser number of sensing elements (e.g., 218, 222, 308, 310, 312, 314, and the like) than that shown in FIGS. 2 and 3. In one embodiment, the floating strike ring 206 and the sensing elements (e.g., 218, 222, 308, 310, 312, 314, and the like) located near it can be electrically isolated by an insulator. The insulator can include a solid material, but is not limited to such.

Within FIG. 2, note that the floating strike ring 206 and sensing element 218 form a gap 220. In one embodiment, by way of comparison, a breakdown voltage across the spark gap 212 can be less than a breakdown voltage across the gap 220. In this manner, an ESD event is more likely to dissipate into ground 216 across the spark gap 212, instead of dissipating into sensor electrode 218 across gap 220. Additionally, the difference in breakdown voltage between the spark gap 212 and the gap 220 can be caused by one or more parameters. For example, the spark gap 212 and the gap 220 can differ in one or more of the following parameters, but is not limited to such, gap distance, radius, electric field concentration, shape of materials, dielectric constant variation, and surface treatment.

Specifically, with regard to gap distance, when the spark gap 212 is implemented with a gap distance that is smaller than the gap distance of gap 220, the breakdown voltage across the spark gap 212 is typically less than the breakdown voltage across gap 220. It is noted that the gap distance can be defined as the shortest distance between the components that form a particular gap. Within FIGS. 2 and 4, it is understood that the gap distance of the spark gap 212 can be implemented in a wide variety of ways. For example, the spark gap 212 can be implemented to have a gap distance of approximately 0.25 millimeters or less, but is not limited to such. Furthermore, the gap distance of gap 220 can be implemented in diverse ways. For example, the gap distance of the gap 220 can be substantially twice the gap distance of spark gap 212, but is not limited to such.

With regard to surface treatment, when the gap 220 has a solid insulator implemented within it while the spark gap 212 has air within it, the breakdown voltage across the spark gap 212 is typically less than the breakdown voltage across gap 220. Furthermore, in another embodiment, the gap 220 is filled with a solid insulator that also submerges a portion of the strike ring 206 (FIG. 3) along with portions of the sensing elements (e.g., 218 and 308) that are proximate to gap 220. Additionally, with regard to dielectric constant variation, when the spark gap 212 has a first dielectric material within it that has a lower dielectric constant than a second dielectric material that is within the gap 220, the breakdown voltage across the spark gap 212 is typically less than the breakdown voltage across gap 220.

Regarding the shape of materials, note that within FIG. 3, the gap 220 is formed by a substantially straight edge of strike ring 206 and a substantially straight edge of sensing element 218. In this manner, an electric field between the strike ring 206 and the sensing element 218 is not concentrated in any one place, but is dispersed across a larger area causing the breakdown voltage across gap 220 to be higher. However, within FIG. 4, strike ring 206 includes a conductive extension component 402 while the ground flood region 214 includes a corresponding conductive extension component 404, which together forms spark gap 212. As such, an electric field between the strike ring 206 and the ground flood region 214 can be concentrated at spark gap 212, thereby causing the breakdown voltage across the spark gap 212 to be less than the breakdown voltage across the gap 220. Note that the shape of materials can be closely related to electric field concentration.

With regard to radius, note that the radius of curvature of each of the extension components 402 and 404 (FIG. 4) that together forms spark gap 212 is much smaller than the radius of each of the substantially straight edges of strike ring 206 and sensing element 218 (FIG. 3) that together forms gap 220. Therefore, an electric field between the strike ring 206 and the ground flood region 214 can be concentrated at spark gap 212, thereby causing the breakdown voltage across the spark gap 212 to be less than the breakdown voltage across the gap 220. It is appreciated that the radius of curvature can be closely related to electric field concentration.

Within FIG. 4, it is noted that the amount of conductive elements coupled to the strike ring 206 that exist on the backside 200c of the touchpad 200 can be minimized (as shown) in order to reduce parasitic capacitance between them and the ground region 214. For example, this can be accomplished by reducing each conductive element to its minimum, which in one embodiment, can include a via annulus (e.g., 210) together with a corresponding conductive extension component (e.g., 402). Also, in order to reduce the previously mentioned parasitic capacitance, it can be desirable to implement the ground flood region 214 such that it does not encroach under the topside section of the strike ring 206 (shown as dashed lines). Furthermore, it can be desirable to implement the ground flood region 214 such that it is located well back from the topside section of the strike ring 206.

Within FIG. 4, it is appreciated that the floating strike ring 206 and the ground flood region element 214 can form one or more spark gaps such as spark gaps 212, 406, and 408.

Within FIGS. 2, 3, and 4, it is understood that the floating strike ring 206 can be implemented to include one or more vias (e.g., 208, 302, 304, and 306). Furthermore, the one or more vias (e.g., 208, 302, 304, and 306) of the floating strike ring 206 can be located anywhere along floating strike ring 206. However, it can be desirable to minimize the distance from where an ESD is initiated to a spark gap (e.g., 212, 406, and/or 408). As such, it can be desirable to implement multiple vias (e.g., 208, 302, 304, and 306) in order to minimize the electrical resistance and inductance of the electrical path to ground 216.

Within FIG. 2, touchpad 200 includes substrate 102 above which can be formed one or more sensing elements (e.g., 218 and 222). The floating strike ring 206 can be formed above substrate 102, extend through the via 208, and can also include the via annulus 210. A solder mask 204 can be formed above the strike ring 206 and the one or more sensing elements (e.g., 218 and 222). The facesheet 202 can be formed above the solder mask 204. It is appreciated that the facesheet 202 of touchpad 200 can be its sensing surface that is substantially planar. The capacitive touchpad 200 can be configured to sense positional information of a conductive object (e.g., a user's finger, a probe, or a stylus) with respect to the sensing surface. The ground flood region 214 can be formed above the substrate 102 on a surface opposite to the surface above which were formed the one or more sensing elements (e.g., 218 and 222). Note that the ground element 214 can be coupled to the voltage ground 216 that can have a low voltage value.

Within FIG. 3, it is noted that touchpad 200 can include a greater or lesser number of sensing elements (e.g., 218, 222, and 308-314) than that shown in the topside plan view 200b. Moreover, touchpad 200 can be implemented with a wide variety of sensing element patterns. It is appreciated that the floating strike ring 206 can also be formed to include the via annulus 210 along with the conductive extension component 402 as shown in the backside plan view 200c of FIG. 4. Note that the floating strike ring 206 can include multiple via annuli (e.g., 210), each having a corresponding conductive extension component (e.g., 402) as shown in FIG. 4.

Figure 5:
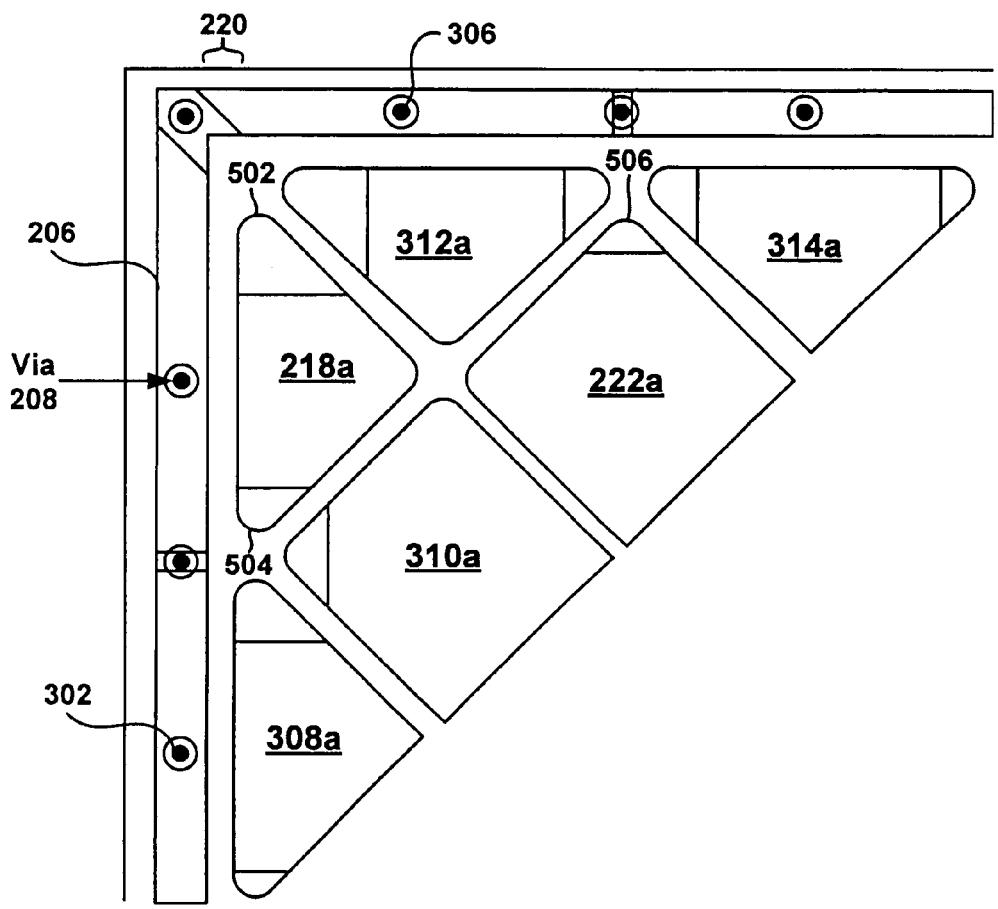
FIG. 5 is another exemplary topside plan view of a portion of an exemplary touchpad in accordance with embodiments of the invention.

FIG. 5 is an exemplary topside plan view 200d of a portion of exemplary touchpad 200 that can include one or more rounded sensor electrodes (e.g., 218a, 222a, 308a, 310a, 312a, and/or 314a) in accordance with embodiments of the invention. In an effort to disperse and avoid concentrating any electrical fields associated with the floating strike ring 206 and any sensing elements or electrodes located near it, the sensing elements 218a, 222a, 308a, 310a, 312a, and/or 314a can be implemented to include one or more rounded (or curved) corners.

For example, since sensing element 218a is located near floating strike ring 206, it may be desirable to reduce the possibility of an electrical charge arcing across the gap 220, which is formed by floating strike ring 206 and sensing element 218a. To prevent this from happening, it may be desirable to minimize those areas of sensing element 218a that are susceptible to electric fields concentrations. As such, corners 502 and 504 of sensing electrode 218a can be implemented as rounded or curved corners that can more evenly disperse electric fields. In like manner, corner 506 of sensing element 222a can be implemented as a rounded or curved corner which can more evenly disperse an electric field. In this fashion, an ESD is less likely to arc across, for example, gap 220 and damage sensing element 218a and/or any circuitry coupled to it.

Within FIG. 5, note that the sensing element 310a can be implemented with a rounded or curved corner in a manner similar to the sensing element 222a, but is not limited to such. The sensing elements 308a, 312a, and 314a can each be implemented with rounded or curved corners in a manner similar to the sensing element 218a, but is not limited to such.

Figure 6:
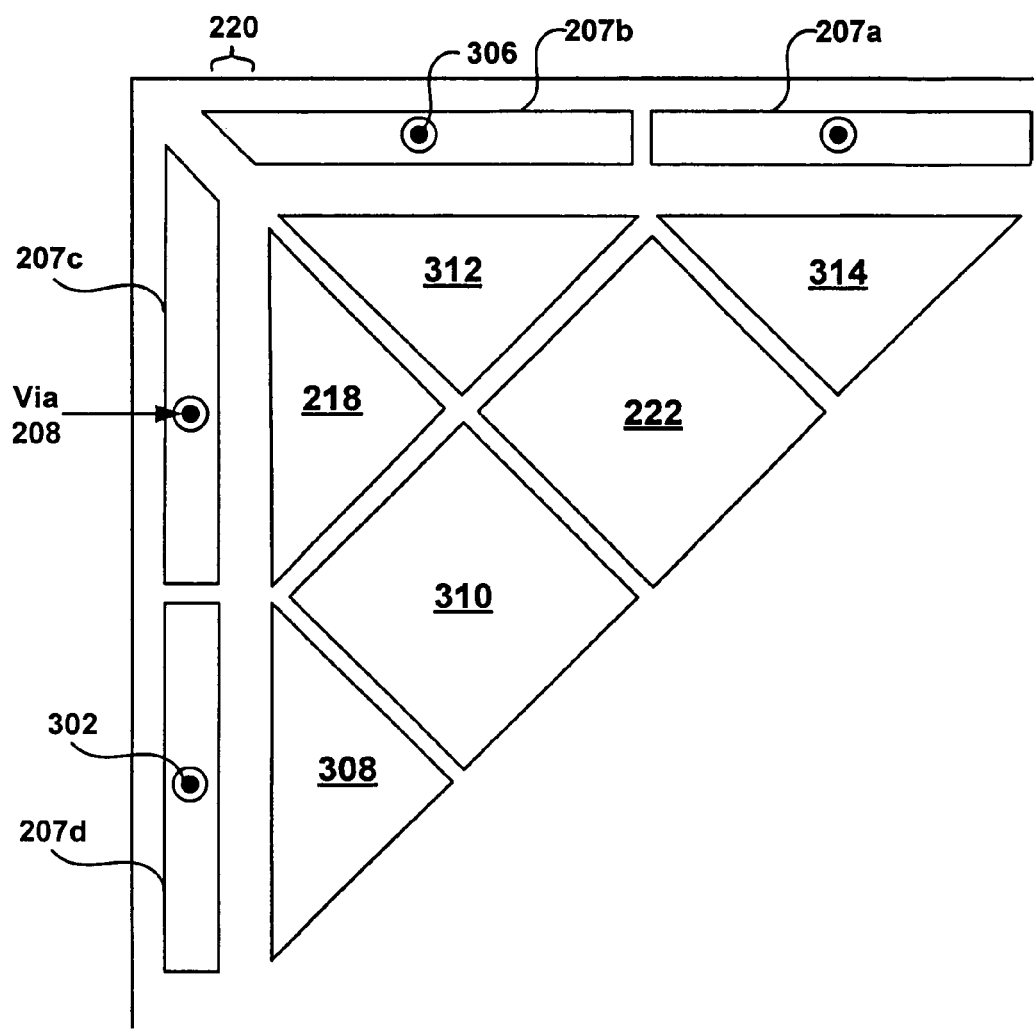
FIG. 6 is yet another exemplary topside plan view of a portion of an exemplary touchpad in accordance with embodiments of the invention.

FIG. 6 is an exemplary topside plan view 200e of a portion of exemplary touchpad 200 that includes a floating strike ring 207 that includes multiple segments (e.g., 207a, 207b, 207c, 207d, and the like) in accordance with embodiments of the invention. It is understood that each segment of the floating strike ring 207 can be implemented with conductive material. In order to prevent sensing elements from capacitively coupling with other sensing elements via a single continuous floating strike ring, topside plan view 200e illustrates the floating strike ring 207 that includes multiple segments 207a, 207b, 207c, 207d, and the like, wherein each segment can be adjacent to a sensor electrode (e.g., 314, 312, 218, or 308). As such, capacitive coupling of each sensor (e.g., 308) can be with its corresponding strike ring segment (e.g., 207d). Moreover, since each strike ring segment (e.g., 207b) can be electrically isolated from its neighboring strike ring segments (e.g., 207a and 207c), sensing electrodes (e.g., 312, 314, and 218) can remain well isolated from one another. Furthermore, when moisture is present on the facesheet 202 of the topside plan view 200e, moisture-coupling effects can be minimized.

Specifically, it is understood that floating strike ring segments (e.g., 207a-207d, and the like) can encircle the sensor electrode region of touchpad 200 in order to provide ESD protection. This design uses discrete floating strike ring sections (e.g., 207a-207d) that can be aligned with each electrode (e.g., 314, 312, 218, and 308) in order to minimize the inter-electrode capacitive coupling of sensor channels that may be caused by a continuous floating strike ring. It is noted that the ratio of a strike ring segment (e.g., 207d) length to its corresponding sensing element (e.g., 308) length is substantially about 1 to 1. However, the length of a strike ring segment (e.g., 207b) can be longer than the length of its corresponding sensing element (e.g., 312). Alternatively, the length of a strike ring segment can be shorter (not shown) than the length of its corresponding sensing element.

Figure 7:
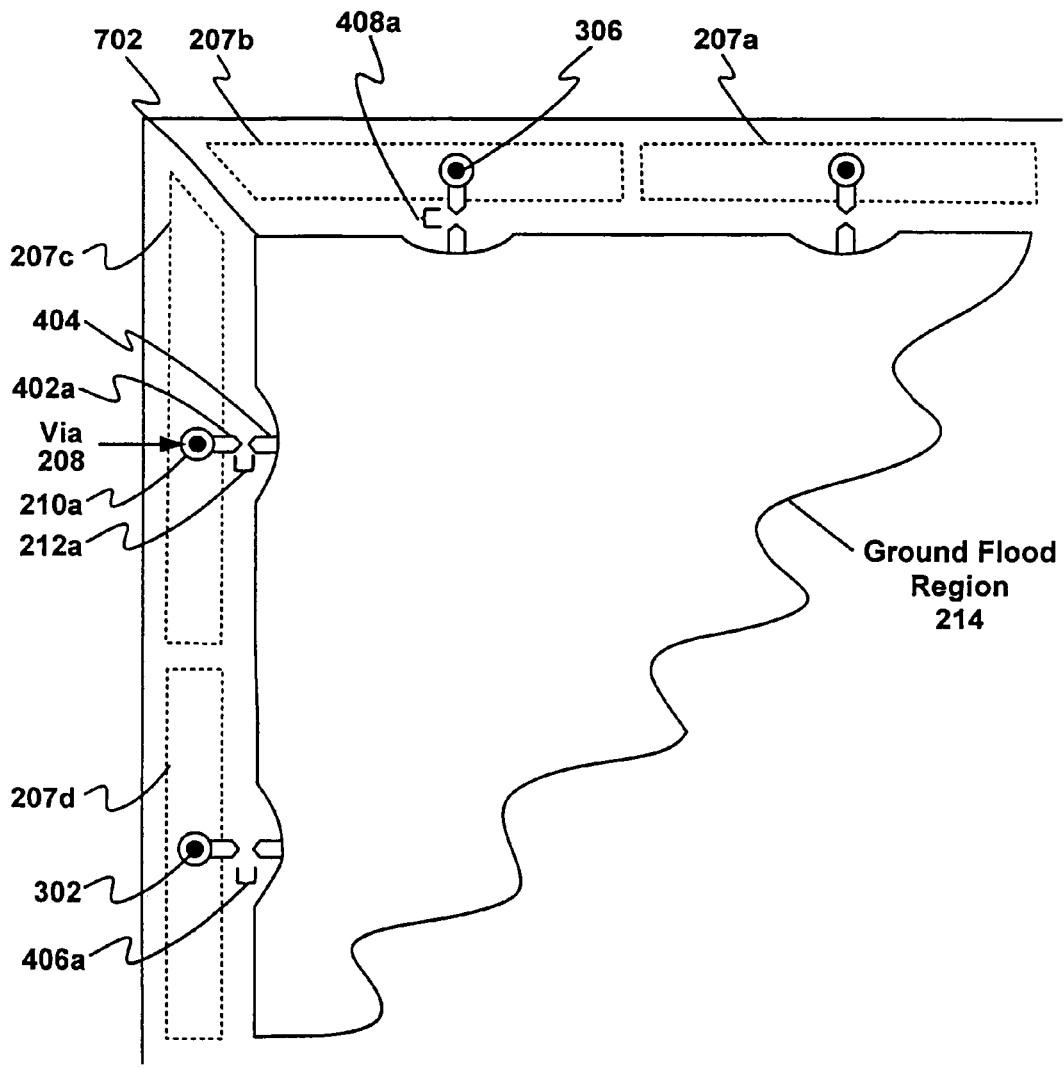
FIG. 7 is another exemplary backside plan view of a portion of an exemplary touchpad in accordance with embodiments of the invention.

FIG. 7 is an exemplary backside plan view 200f of a portion of exemplary touchpad 200 that includes multiple spark gaps (e.g., 212a, 406a, and 408a) and floating strike ring 207 that includes multiple segments in accordance with embodiments of the invention. It is noted that backside plan view 200f of FIG. 7 and topside plan view 200e of FIG. 6 can be implemented in any manner similar to that described herein with reference to touchpad 200, but is not limited to such.

For example, the floating strike ring 207 includes a plurality of strike ring segments (e.g., 207a-207d) that can be electrically isolated from the one or more sensing elements (e.g., 314, 312, 218, and 308). Moreover, the plurality of segments and the ground element 214 together forms a plurality of spark gaps (e.g., 212a, 406a, and 408b) that can be used for reducing potential damage to the capacitive touchpad 200 that may be caused by it encountering an electrostatic discharge. Note that the one or more sensing elements (e.g., 314, 312, 218, and 308) and the multiple strike ring segments (e.g., 207a-207d) can be electrically isolated from each other by an insulator. The insulator can include a solid material, but is not limited to such.

Within FIG. 6, it is appreciated that strike ring segment 207c and sensing element 218 form a gap 220a. In one embodiment, by way of comparison, a breakdown voltage across the spark gap 212a can be less than a breakdown voltage across the gap 220a. In this fashion, an ESD event is more likely to dissipate into ground 216 across the spark gap 212a, instead of dissipating into sensor electrode 218 across gap 220a. Furthermore, the difference in breakdown voltage between the spark gap 212a and the gap 220a can be caused by one or more parameters. For example, the spark gap 212a and the gap 220a can differ in one or more of the following parameters, but is not limited to such, gap distance, radius, electric field concentration, shape of materials, dielectric constant variation, and surface treatment. It is understood that these parameters associated with spark gap 212a and gap 220a can be implemented in any manner similar to that described herein, but is not limited to such.

Within FIG. 7, the amount of conductive elements coupled to the strike ring 207 that exist on the backside 200f of the touchpad 200 can be minimized (as shown) in order to reduce parasitic capacitance between them and the ground region 214. For example, this can be accomplished by reducing each conductive element to its minimum, which in one embodiment, can include a via annulus (e.g., 210a) together with a corresponding conductive extension component (e.g., 402a). Additionally, in order to reduce the previously mentioned parasitic capacitance, it can be desirable to implement the ground flood region 214 such that it does not encroach under the topside floating strike ring segments 207a-207d (shown as dashed lines). Moreover, it can be desirable to implement the ground flood region 214 such that it is located well back from the topside floating strike ring segments 207a-207d.

Within FIG. 7, it is appreciated that the floating strike ring segments 207a-207d of floating strike ring 207 and the ground flood region element 214 can each form one or more spark gaps such as spark gaps 212a, 406a, and 408a. Note that it can be desirable for corner 702 of the ground flood region 214 to be implemented having approximately a 90 degree corner (as shown), thereby providing a current path to ground 216 (FIG. 2) for an ESD event that occurs between floating strike ring segments 207b and 207c.

Within FIGS. 2, 6, and 7, it is appreciated that the floating strike ring segments 207a-207d of the floating strike ring 207 can be implemented to include one or more vias (e.g., 208, 302, and 306). Furthermore, the one or more vias (e.g., 208, 302, and 306) of each of the strike ring segments 207a-207d can be located anywhere along its corresponding segment. However, it can be desirable to minimize the distance from where an ESD is initiated to a spark gap (e.g., 212a, 406a, and/or 408a). As such, depending on the size or length of the strike ring segment, it may be desirable to utilize multiple vias in order to minimize the electrical resistance and inductance of the electrical path to ground 216.

Figure 8:
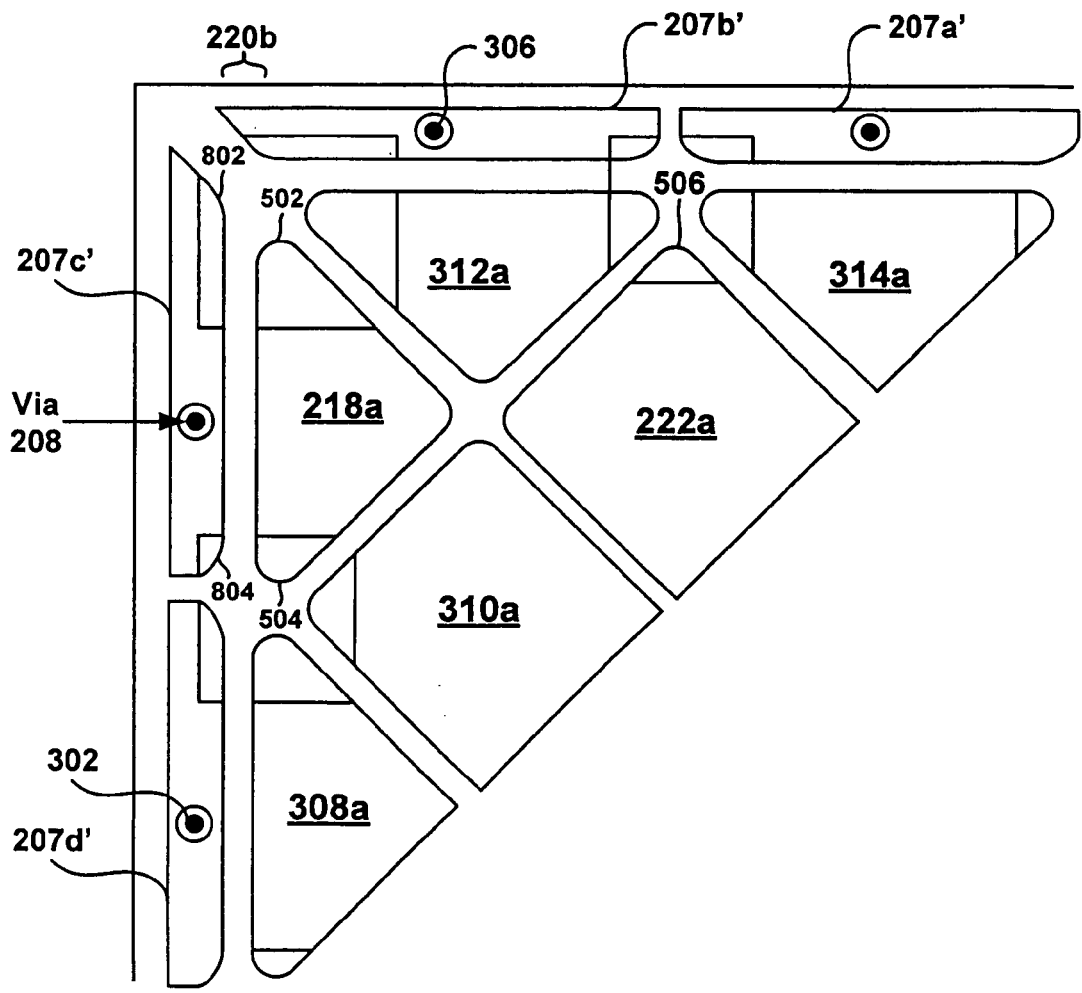
FIG. 8 is still another exemplary topside plan view of a portion of an exemplary touchpad in accordance with embodiments of the invention.

FIG. 8 is an exemplary topside plan view 200g of a portion of exemplary touchpad 200 that can include one or more rounded sensor electrodes (e.g., 218a, 222a, 308a, 310a, 312a, and/or 314a) along with one or more rounded floating strike ring segments (e.g., 207a', 207b', 207c', and/or 207d') in accordance with embodiments of the invention. In an effort to disperse and avoid concentrating any electrical fields associated with the floating strike ring segments 207a'-207d' and any sensing elements or electrodes located near them, the sensing elements 218a, 222a, 308a, 310a, 312a, and/or 314a along with the floating strike ring segments e.g., 207a', 207b', 207c', and/or 207d' can each been implemented to include one or more rounded (or curved) corners.

For example, since sensing element 218a is located near floating strike ring segment 207c', it may be desirable to reduce the possibility of an electrical charge arcing across the gap 220b, which is formed by floating strike ring segment 207c' and sensing element 218a. To prevent this from happening, it may be desirable to minimize those areas of sensing element 218a and floating strike ring segment 207c' that are susceptible to electric fields concentrations. As such, corners 502 and 504 of sensing electrode 218a can be implemented as rounded or curved corners that can more evenly disperse electric fields. Furthermore, corners 802 and 804 of the strike ring segment 207c' can also be implemented as rounded or curved corners that can more evenly disperse electric fields. In like manner, corner 506 of sensing element 222a can be implemented as a rounded or curved corner which can more evenly disperse an electric field. In this fashion, an ESD is less likely to arc across, for example, gap 220b and damage sensing element 218a and/or any circuitry coupled to it.

Within FIG. 8, note that the floating strike ring segment 207b' can be implemented with rounded or curved corners in a manner similar to the floating strike ring segment 207c', but is not limited to such. The floating strike ring segment 207d' can be implemented with rounded or curved corners in a manner similar to the floating strike ring segment 207a', but is not limited to such. The sensing element 310a can be implemented with a rounded or curved corner in a manner similar to the sensing element 222a, but is not limited to such. The sensing elements 308a, 312a, and 314a can each be implemented with rounded or curved corners in a manner similar to the sensing element 218a, but is not limited to such.

Figure 9:
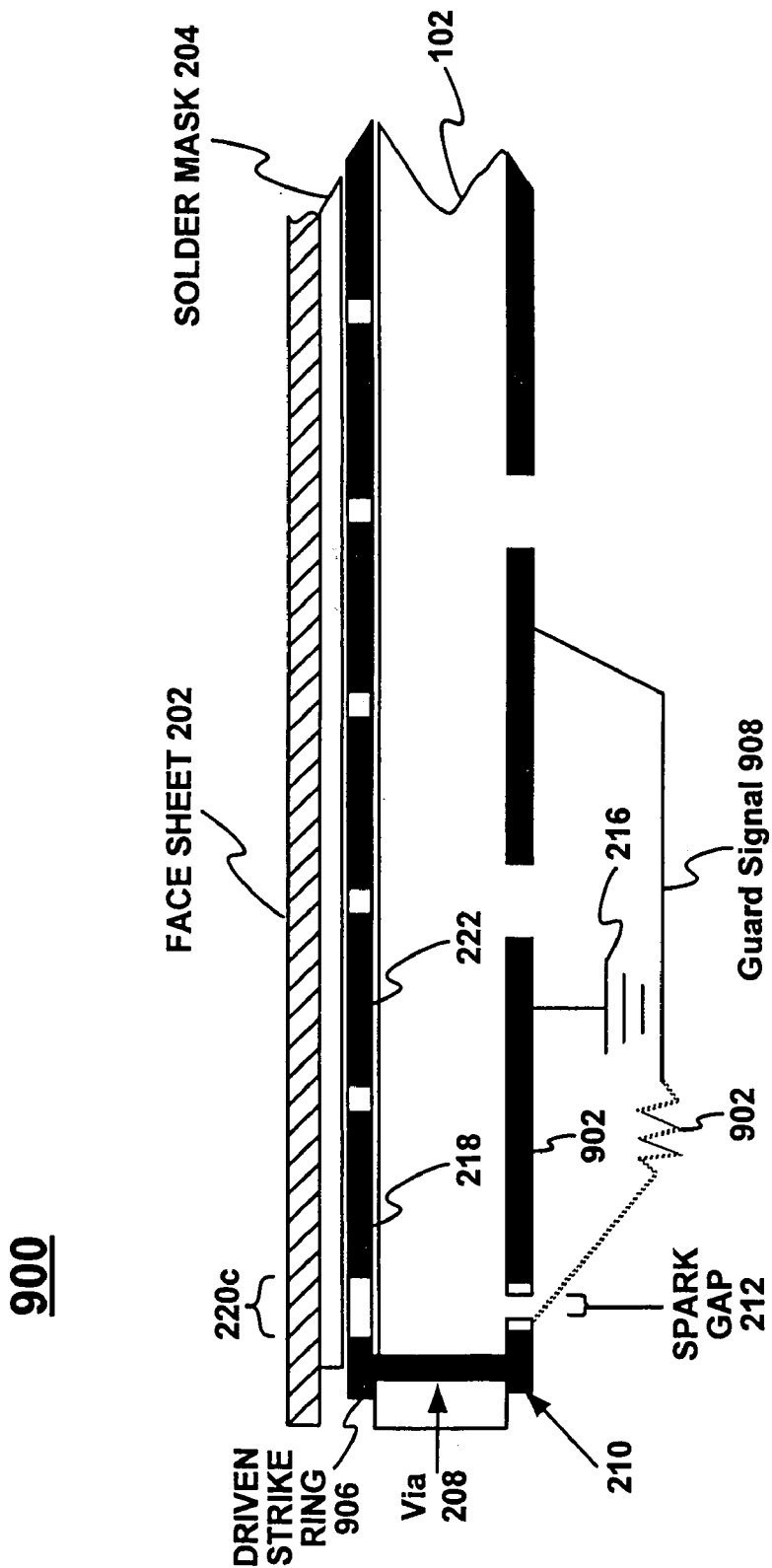
FIG. 9 is another exemplary side sectional view of a portion of an exemplary touchpad in accordance with embodiments of the invention.

FIG. 9 is an exemplary side sectional view of a portion of an exemplary capacitive touchpad 900 including a driven strike ring 906 in accordance with embodiments of the invention. It is understood that capacitive touchpad 900 can be implemented in any manner similar to that described herein, but is not limited to such. The driven strike ring 906 can be electrically driven through an impedance path 904 with a guard signal 908. Note that this design enables ESD events to shunt current to ground via spark gap 212 without damage to guard circuitry (not shown). Additionally, the electrical potential of the driven strike ring 906 can be electrically driven by the guard signal 908 near the electrical potential of the one or more sensing elements (e.g., 218) located near it. The driven strike ring 906 can be implemented in a manner similar to floating strike ring 206 or segmented floating strike ring 207. If the driven strike ring 906 is implemented in a manner similar to segmented floating strike ring 207, it is understood that there would be an impedance path (e.g., 904) coupled to each segment of the driven strike ring 906 to enable each to be electrically driven by one or more guard signals (e.g., 908).

The impedance path 904 can be implemented with a capacitive component, a resistive component, and/or an inductive component. In one embodiment, the coupling path 904 can include a high impedance resistor having high electrical breakdown strength. As such, if an ESD event occurs, before there is enough voltage across the resistor of path 904 to damage the guard circuitry, the breakdown voltage across the spark gap 212 is exceeded and the electrical charge arcs into ground 216 via ground element 902. Therefore, it may be desirable for the resistance of the coupling path 904 to be implemented high enough so that it can provide some time constant delay. Alternatively, if the coupling path 904 has low enough impedance, it may not be desirable for the strike ring 906 to be segmented to reduce sensor channel coupling. However, this implementation can involve a low-voltage spark gap 212 in order to prevent damage to the guard circuitry.

Within FIG. 9, in another embodiment, the coupling path 904 can include capacitive coupling designed into the touchpad 900. For example, spark gap 212 of touchpad 900 can be implemented with a small capacitance to ground 216 (via ground element 902) while a larger capacitance can be implemented as part of coupling path 904 to guard signal 908. It is understood that guard signal 908 can be implemented as the same signal sent to a sensing element (e.g., 218 or 222) of touchpad 900.

Within capacitive touchpad 900, the driven strike ring 906 can be electrically isolated from the one or more sensing elements (e.g., 218 and/or 222) and also electrically isolated from the ground element 902. In one embodiment, the driven strike ring 906 can be electrically driven by guard signal 908 through impedance path 904. The driven strike ring 906 and the ground element 902 can together form the spark gap 212 that can reduce potential damage to the touchpad 900 when it encounters an electrostatic discharge. The guard signal 908 can electrically drive the driven strike ring 906 substantially near an electrical potential of a sensing element (e.g., 218). Note that the guard signal 908 can be produced by guard circuitry. Furthermore, it is understood that the spark gap 212 can reduce potential damage to the guard circuitry that can be caused by an electrostatic discharge encountered by the touchpad 900. Within touchpad 900, it is understood that the one or more sensing elements (e.g., 218 and/or 222) and the driven strike ring 906 can be electrically isolated from each other by an insulator. Understand that the insulator can be implemented as a solid material, but is not limited to such. Note that the driven strike ring 906 and the ground element 902 can together form one or more spark gaps similar to spark gap 212.

Within FIG. 9, it is appreciated that strike ring 906 and sensing element 218 form a gap 220*c*. In one embodiment, a breakdown voltage across the spark gap 212 can be less than a breakdown voltage across the gap 220*c*. In this fashion, an ESD event is more likely to dissipate into ground 216 across the spark gap 212, instead of dissipating into sensor electrode 218 across gap 220*c*. Furthermore, the difference in breakdown voltage between the spark gap 212 and the gap 220*c* can be caused by different values of one or more parameters. For example, the spark gap 212 and the gap 220*c* can differ in one or more of the following parameters, but is not limited to such, gap distance, radius, electric field concentration, shape of materials, dielectric constant variation, and surface treatment. It is understood that these parameters associated with spark gap 212 and gap 220*c* can be implemented in any manner similar to that described herein, but is not limited to such.

Within FIGS. 2-9, it is understood that a touch screen or any other type of capacitive sensor apparatus can be implemented in any manner similar to that described herein with reference to touchpads 200 and 900, but is not limited to such.

Figure 10:
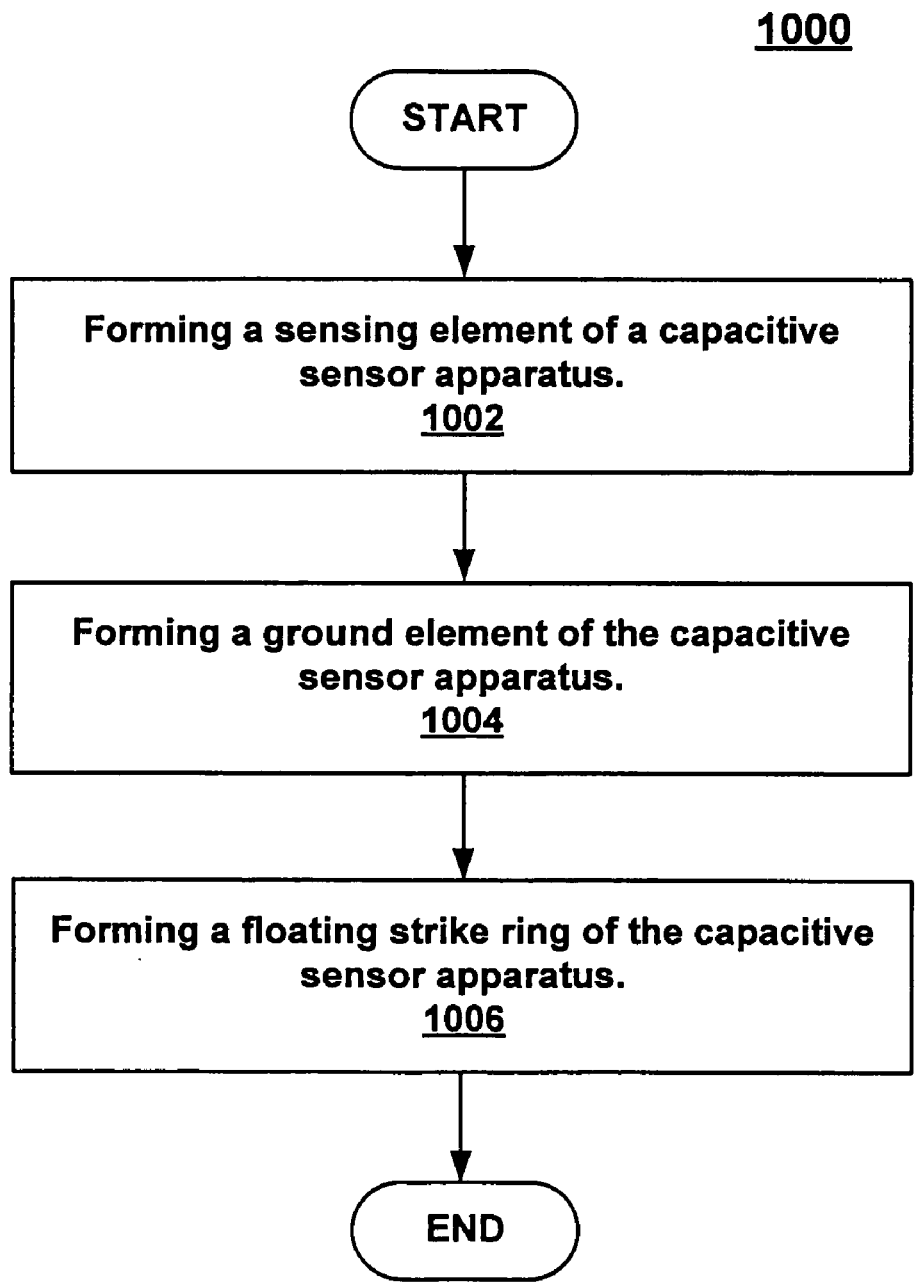
FIG. 10 is a flowchart of a method in accordance with embodiments of the invention for fabricating a capacitive sensor apparatus that includes a floating strike ring.

FIG. 10 is a flowchart of a method 1000 in accordance with embodiments of the invention for fabricating a capacitive sensor apparatus that includes a floating strike ring. Although specific operations are disclosed in method 1000, such operations are exemplary. That is, method 1000 may not include all of the operations illustrated by FIG. 10. Alternatively, method 1000 may include various other operations and/or variations of the operations shown by FIG. 10. Likewise, the sequence of the operations of method 1000 can be modified. Noted that the operations of method 1000 may include utilizing software, firmware, electronic hardware, fabrication hardware, or any combination thereof.

Specifically, a sensing element can be formed that is part of a capacitive sensor apparatus. Additionally, a voltage ground element can be formed that is part of the capacitive sensor apparatus. Moreover, a floating strike ring can be formed that is part of the capacitive sensor apparatus. Note that the floating strike ring can be electrically isolated from the sensing element and the voltage ground element. The floating strike ring and the ground element can together form a spark gap. It is understood that the spark gap can reduce potential damage to the capacitive sensor apparatus that can be caused when it encounters an electrostatic discharge.

At operation 1002 of FIG. 10, one or more sensing elements (e.g., 218 and/or 222) can be formed that are part of a capacitive sensor apparatus (e.g., touchpad 200 or 900). Operation 1002 can be implemented in a wide variety of ways. For example, the one or more sensing elements at operation 1002 can be formed in any manner similar to that described herein, but is not limited to such. Additionally, the capacitive sensor apparatus at operation 1002 can be implemented as a touchpad, a touch screen, or the like, but is not limited to such.

At operation 1004, one or more voltage ground elements (e.g., 214 or 902) can be formed that are part of the capacitive sensor apparatus. It is understood that operation 1004 can be implemented in diverse ways. For example, the one or more voltage ground elements at operation 1004 can be formed in any manner similar to that described herein, but is not limited to such.

At operation 1006 of FIG. 10, a floating strike ring (e.g., 206 or 207) can be formed that is part of the capacitive sensor apparatus. Note that operation 1006 can be implemented in wide variety of ways. For example, the floating strike ring can be formed at operation 1006 in any manner similar to that described herein, but is not limited to such.

Figure 11:
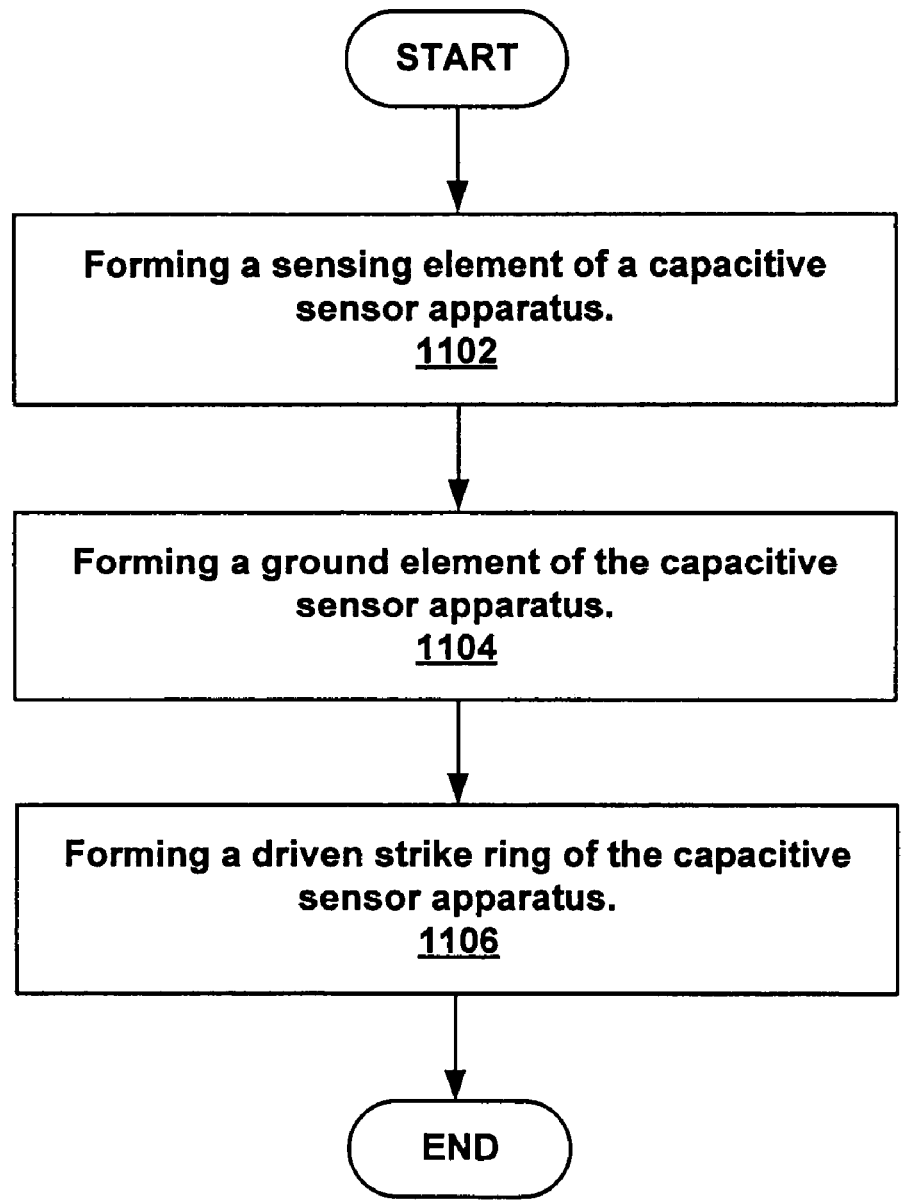
FIG. 11 is a flowchart of a method in accordance with embodiments of the invention for fabricating a capacitive sensor apparatus that includes a driven strike ring.

FIG. 11 is a flowchart of a method 1100 in accordance with embodiments of the invention for fabricating a capacitive sensor apparatus that includes a driven strike ring. Although specific operations are disclosed in method 1100, such operations are exemplary. That is, method 1100 may not include all of the operations illustrated by FIG. 11. Alternatively, method 1100 may include various other operations and/or variations of the operations shown by FIG. 11. Likewise, the sequence of the operations of method 1100 can be modified. Noted that the operations of method 1100 may include utilizing software, firmware, electronic hardware, fabrication hardware, or any combination thereof.

Specifically, a sensing element can be formed that is part of a capacitive sensor apparatus. Furthermore, a voltage ground element can be formed that is part of the capacitive sensor apparatus. A driven strike ring can be formed that is part of the capacitive sensor apparatus. Note that the driven strike ring can be electrically isolated from the sensing element and the voltage ground element. Additionally, the driven strike ring can be electrically driven by a guard signal through an impedance path. The driven strike ring and the voltage ground element can together form a spark gap. It is appreciated that the spark gap can reduce potential damage to the capacitive sensor apparatus that can be caused when it encounters an electrostatic discharge.

At operation 1102 of FIG. 11, one or more sensing elements (e.g., 218 and/or 222) can be formed that are part of a capacitive sensor apparatus (e.g., touchpad 200 or 900). Operation 1102 can be implemented in a wide variety of ways. For example, the one or more sensing elements at operation 1102 can be formed in any manner similar to that described herein, but is not limited to such. Additionally, the capacitive sensor apparatus at operation 1102 can be implemented as a touchpad, a touch screen, or the like, but is not limited to such.

At operation 1104, one or more voltage ground elements (e.g., 214 or 902) can be formed that are part of the capacitive sensor apparatus. It is understood that operation 1104 can be implemented in diverse ways. For example, the one or more voltage ground elements at operation 1104 can be formed in any manner similar to that described herein, but is not limited to such.

At operation 1106 of FIG. 11, a driven strike ring (e.g., 906) can be formed that is part of the capacitive sensor apparatus. Note that operation 1106 can be implemented in wide variety of ways. For example, the driven strike ring can be formed at operation 1106 in any manner similar to that described herein, but is not limited to such.

The foregoing descriptions of specific embodiments in accordance with the invention have been presented for purposes of illustration and description. They are not intended to be exhaustive or to limit the invention to the precise forms disclosed, and obviously many modifications and variations are possible in light of the above teaching. The invention can be construed according to the Claims and their equivalents.

What is claimed is:

1. A capacitive sensor apparatus comprising:
   a sensing element;
   a ground element; and
   a floating strike ring electrically isolated from said sensing element, said floating strike ring and said ground element forming a spark gap for reducing potential damage to said capacitive sensor apparatus causable by an electrostatic discharge encountered by said capacitive sensor apparatus.

2. The capacitive sensor apparatus of claim 1, further comprising a second sensing element.

3. The capacitive sensor apparatus of claim 1, wherein said sensing element and said floating strike ring are electrically isolated from each other by an insulator.

4. The capacitive sensor apparatus of claim 3, wherein said insulator comprises a solid material.

5. The capacitive sensor apparatus of claim 1, wherein said floating strike ring and said sensing element form a gap, wherein a breakdown voltage across said spark gap is less than a breakdown voltage across said gap.

6. The capacitive sensor apparatus of claim 5, wherein said spark gap and said gap differ in a parameter selected from the group consisting of gap distance, radius, electric field concentration, shape of materials, dielectric constant variation, and surface treatment.

7. The capacitive sensor apparatus of claim 1, wherein the gap distance of said spark gap is approximately 0.25 millimeters or less.

8. The capacitive sensor apparatus of claim 1, wherein said floating strike ring and said ground element form a second spark gap.

9. The capacitive sensor apparatus of claim 1, wherein said capacitive sensor apparatus is a touchpad.

10. The capacitive sensor apparatus of claim 1, wherein said capacitive sensor apparatus is a touch screen.

11. A capacitive sensor apparatus comprising:
    a sensing element;
    a ground element; and
    a floating strike ring comprising a plurality of segments electrically isolated from said sensing element, said plurality of segments and said ground element forming a plurality of spark gaps for reducing potential damage to said capacitive sensor apparatus causable by an electrostatic discharge encountered by said capacitive sensor apparatus.

12. The capacitive sensor apparatus of claim 11, further comprising a sensing surface that is substantially planar, wherein said capacitive sensor apparatus is configured to sense positional information of a conductive object with respect to said sensing surface.

13. The capacitive sensor apparatus of claim 11, wherein said sensing element and said plurality of segments are electrically isolated from each other by an insulator.

14. The capacitive sensor apparatus of claim 13, wherein said insulator comprises a solid material.

15. The capacitive sensor apparatus of claim 11, wherein a segment of said plurality of segments and said sensing element form a gap, wherein a breakdown voltage across said spark gap is less than a breakdown voltage across said gap.

16. The capacitive sensor apparatus of claim 15, wherein the difference in breakdown voltage between said spark gap and said gap derives from a parameter selected from the group consisting of gap distance, radius, electric field concentration, shape of materials, dielectric constant variation, and surface treatment.

17. The capacitive sensor apparatus of claim 11, wherein a gap distance of one of said plurality of spark gaps is approximately 0.25 millimeters or less.

18. The capacitive sensor apparatus of claim 11, wherein said capacitive sensor apparatus is a touchpad.

19. The capacitive sensor apparatus of claim 11, wherein said capacitive sensor apparatus is a touch screen.

20. A capacitive sensor apparatus comprising:
    a sensing element;
    a ground element; and
    a driven strike ring electrically isolated from said sensing element and electrically isolated from said ground element, said driven strike ring electrically driven by a guard signal through an impedance path, said driven strike ring and said ground element forming a spark gap for reducing potential damage to said capacitive sensor apparatus causable by an electrostatic discharge encountered by said capacitive sensor apparatus.

21. The capacitive sensor apparatus of claim 20, wherein said guard signal electrically drives said driven strike ring substantially near an electrical potential of said sensing element.

22. The capacitive sensor apparatus of claim 20, wherein said impedance path is selected from the group consisting of a capacitive component, a resistive component, and an inductive component.

23. The capacitive sensor apparatus of claim 20, wherein said guard signal is produced by guard circuitry, and wherein said spark gap reduces potential damage to said guard circuitry causable by said electrostatic discharge encountered by said capacitive sensor apparatus.

24. The capacitive sensor apparatus of claim 20, wherein said sensing element and said driven strike ring are electrically isolated from each other by an insulator.

25. The capacitive sensor apparatus of claim 24, wherein said insulator comprises a solid material.

26. The capacitive sensor apparatus of claim 20, wherein said driven strike ring and said sensing element form a gap, wherein a breakdown voltage across said spark gap is less than a breakdown voltage across said gap.

27. The capacitive sensor apparatus of claim 26, wherein the difference in breakdown voltage between said spark gap and said gap is caused by different values of a parameter selected from the group consisting of gap distance, radius, electric field concentration, shape of materials, dielectric constant variation, and surface treatment.

28. The capacitive sensor apparatus of claim 20, wherein the gap distance of said spark gap is approximately 0.25 millimeters or less.

29. The capacitive sensor apparatus of claim 20, wherein said driven strike ring and said ground element form a second spark gap.

30. The capacitive sensor apparatus of claim 20, wherein said driven strike ring comprises a plurality of segments.

31. The capacitive sensor apparatus of claim 20, further comprising a substantially planar sensing surface.

32. The capacitive sensor apparatus of claim 31, wherein said capacitive sensor apparatus is configured to sense positional information of a conductive object with respect to said substantially planar sensing surface.

33. The capacitive sensor apparatus of claim 20, wherein said capacitive sensor apparatus is a touchpad.

34. The capacitive sensor apparatus of claim 20, wherein said capacitive sensor apparatus is a touch screen.

35. A method comprising:
   forming a sensing element of a capacitive sensor apparatus;
   forming a ground element of said capacitive sensor apparatus; and
   forming a floating strike ring of said capacitive sensor apparatus, said floating strike ring electrically isolated from said sensing element, said floating strike ring and said ground element forming a spark gap for reducing potential damage to said capacitive sensor apparatus causable by an electrostatic discharge encountered by said capacitive sensor apparatus.

36. The method as described in claim 35, wherein said sensing element and said floating strike ring are electrically isolated by an insulator.

37. The method as described in claim 36, wherein said insulator comprises a solid material.

38. The method described in claim 35, wherein said floating strike ring and said sensing element form a gap, wherein a breakdown voltage across said spark gap is less than a breakdown voltage across said gap.

39. The method described in claim 38, wherein the difference in breakdown voltage between said spark gap and said gap is caused by a difference in a parameter selected from the group consisting of gap distance, radius, electric field concentration, shape of materials, dielectric constant variation, and surface treatment.

40. The method described in claim 35, wherein the distance of said spark gap is approximately 0.25 millimeters or less.

41. The method described in claim 35, wherein said floating strike ring comprises a plurality of segments electrically isolated from said sensing element.

42. The method described in claim 41, wherein said plurality of segments and said ground element form a plurality of spark gaps.

43. A method comprising:
   forming a sensing element of a capacitive sensor apparatus;
   forming a ground element of said capacitive sensor apparatus; and
   forming a driven strike ring of said capacitive sensor apparatus, said driven strike ring electrically isolated from said sensing element, said driven strike ring electrically driven by a guard signal through an impedance path, said driven strike ring and said ground element forming a spark gap for reducing potential damage to said capacitive sensor apparatus causable by an electrostatic discharge encountered by said capacitive sensor apparatus.

44. The method described in claim 43, wherein said guard signal electrically drives said driven strike ring substantially near an electrical potential of said sensing element.

45. The method described in claim 43, wherein said driven strike ring and said sensing element form a gap, wherein a breakdown voltage across said spark gap is less than a breakdown voltage across said gap.

46. The method described in claim 45, wherein the difference in breakdown voltage between said spark gap and said gap is caused by different values of a parameter selected from the group consisting of gap distance, radius, electric field concentration, shape of materials, dielectric constant variation, and surface treatment.

47. The method described in claim 43, wherein said driven strike ring and said ground element form a plurality of spark gaps.

48. The method described in claim 43, wherein said driven strike ring comprises a plurality of segments.

* * * * *